United States Patent [19]
Cheng

[11] Patent Number: 6,062,589
[45] Date of Patent: May 16, 2000

[54] COLLAPSIBLE STROLLER

[75] Inventor: Ying-Hsiung Cheng, Tainan Hsien, Taiwan

[73] Assignee: Pao Hsien Cheng, Tainan Hsien, Taiwan

[21] Appl. No.: 09/190,113

[22] Filed: Nov. 12, 1998

[51] Int. Cl.[7] ...................................................... B62B 1/00
[52] U.S. Cl. ........................ 280/647; 280/642; 280/644; 280/650; 280/47.38; 403/109.3; 297/16.1
[58] Field of Search ..................................... 280/642, 650, 280/652, 647, 644, 47.38; 297/130, 16.1, 16.2; 403/109.3, 109.2, 104

[56] References Cited

U.S. PATENT DOCUMENTS

| | | | |
|---|---|---|---|
| 5,388,852 | 2/1995 | Bigo et al. | 280/42 |
| 5,645,293 | 7/1997 | Cheng | 280/47.38 |
| 5,938,230 | 8/1999 | Huang et al. | 280/650 |

*Primary Examiner*—Michael Mar
*Assistant Examiner*—Hau Phan
*Attorney, Agent, or Firm*—Rosenberg, Klein & Lee

[57] ABSTRACT

A collapsible stroller is provided for transporting a child. The stroller has a push handle, and supporting members capable of pivoting relative to one another such that the stroller can be folded or expanded. A connecting block is movably connected to a first one of the supporting members, and can move along with the push handle; the first supporting member has an engaging protrusion capable of resiliently engaging the connecting block to stop the same from moving when the stroller is disposed in the expanded position; the connecting block has a pressing block, which, when depressed, can urge the engaging protrusion to move into the first connecting member for permitting the connecting block to be moved downward along with the push handle in order to fold the stroller.

1 Claim, 6 Drawing Sheets

COLLAPSIBLE STROLLER

BACKGROUND AND SUMMARY OF THE INVENTION

The present invention relates to a collapsible stroller, and more particularly to one which can be moved to an expanded operating position or a folded position very easily.

Collapsible strollers are well known in the art. Users can expand such collapsible strollers to a use position for transporting a child therein, and can fold the same to compact folded ones for easily storage. The collapsible strollers are very popular mainly because they, when not in use, can be folded and will not occupy too much room.

Because collapsible strollers might be folded and unfolded frequently by the users according to their demands, it is important that the collapsible strollers can be folded and unfolded very easily and conveniently. Therefore, it is a main object of the present invention to provide a collapsible stroller which can be moved between a folded position and an expanded operating position readily and conveniently.

The collapsible stroller of the present invention comprises a push handle, a front supporting member, a rear supporting member as the main parts; the above three main parts are connected such that they can pivot relative each other.

A connecting block is movably connected to the rear supporting member; the connecting block can move along with the push handle by a connecting rod pivoted to both the push handle and the connecting block.

The rear supporting member has an engaging protrusion resiliently projecting beyond the rear supporting member; when the stroller is disposed in an expanded use position, the engaging protrusion will engage a lower end of the connecting block to stop the same from moving downwards and prevent the stroller from being unwarily folded.

Furthermore, the connecting block has a pressing block, which, when the stroller is in the expanded position, can be pressed downward to urge the engaging protrusion into the rear supporting member for permitting the connecting block to be moved along with the push handle in order to collapse the stroller; thus, it is very easy and convenient to fold and expand the stroller in the present invention.

BRIEF DESCRIPTION OF THE DRAWINGS

The present invention will be better understood with reference to the accompanying drawings, wherein.

DETAILED DESCRIPTION OF THE PREFERRED EMBODIMENTS

Figure 1:
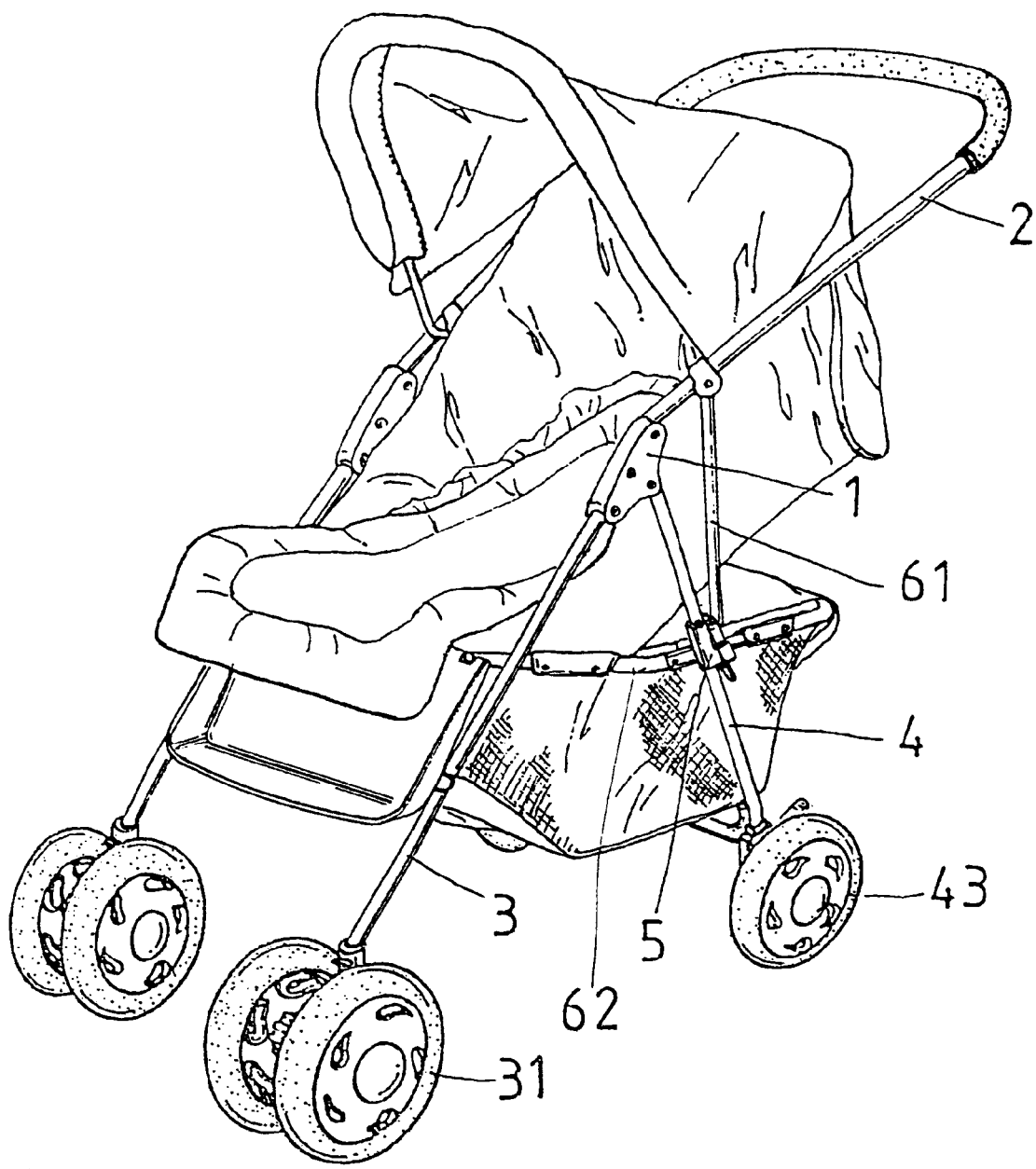
FIG. 1 is a perspective view of a collapsible stroller of the present invention.
Figure 2:
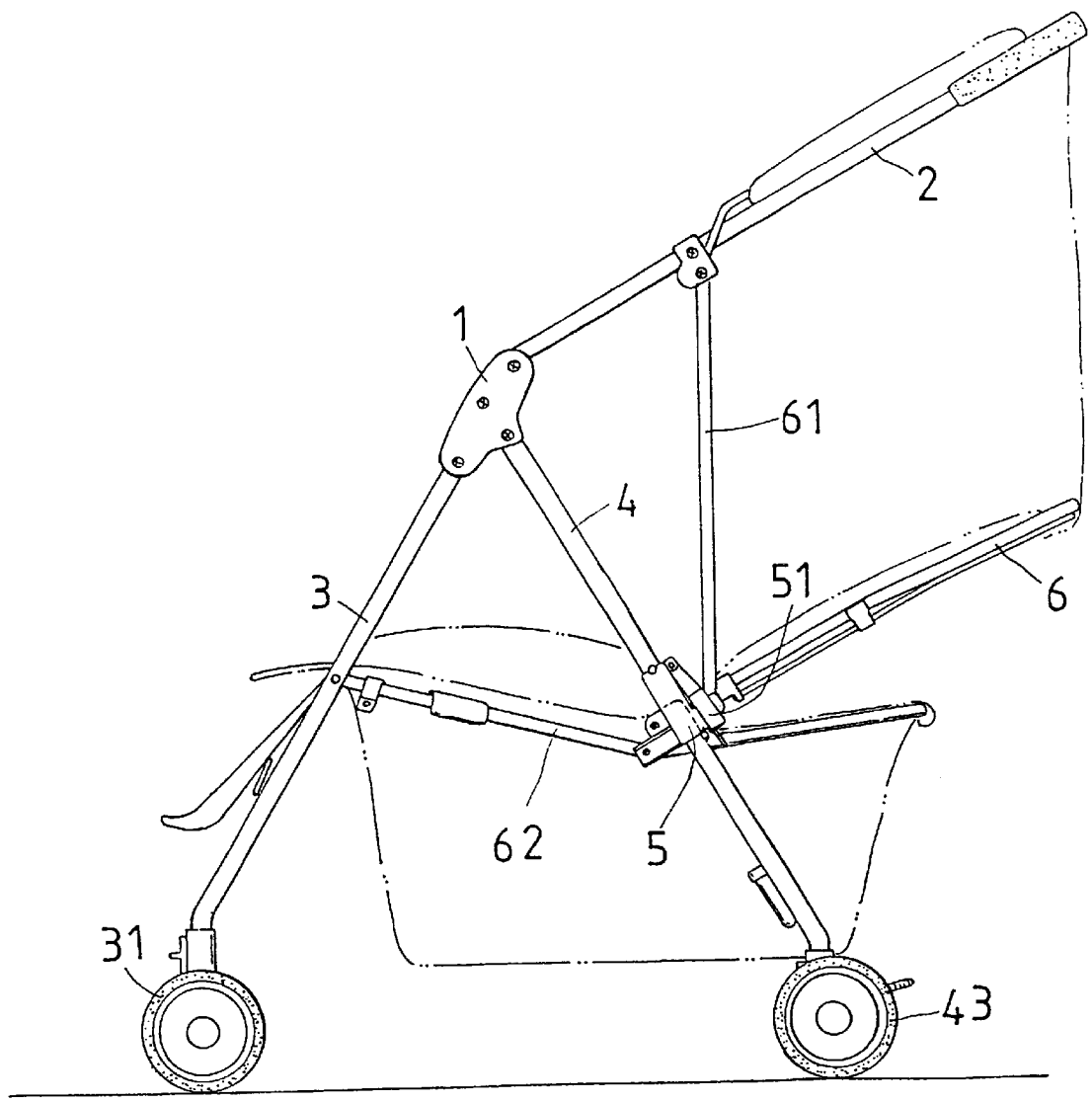
FIG. 2 is a side view of the collapsible stroller of the present invention.
Figure 5:
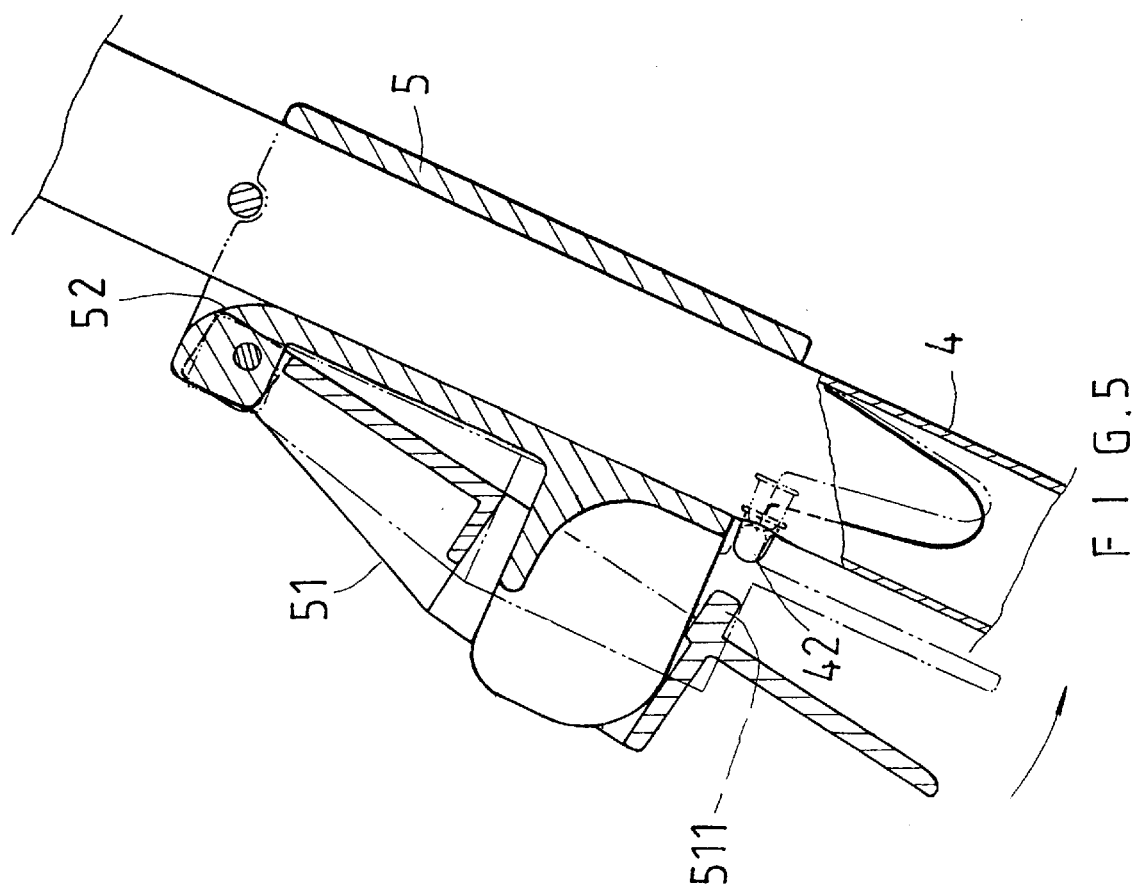
FIG. 5 is a view showing a second step of collapsing an expanded stroller of the present invention.
Figure 3:
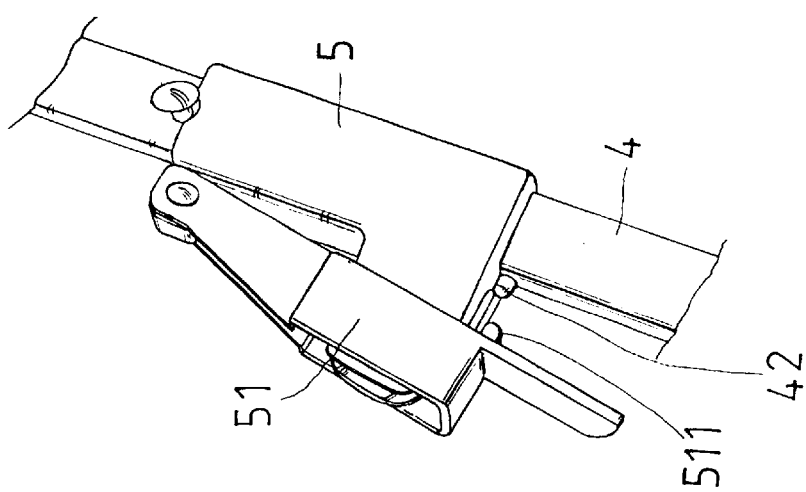
FIG. 3 is a perspective view of a connecting block and the associated parts of the stroller of the present invention.
Figure 4:
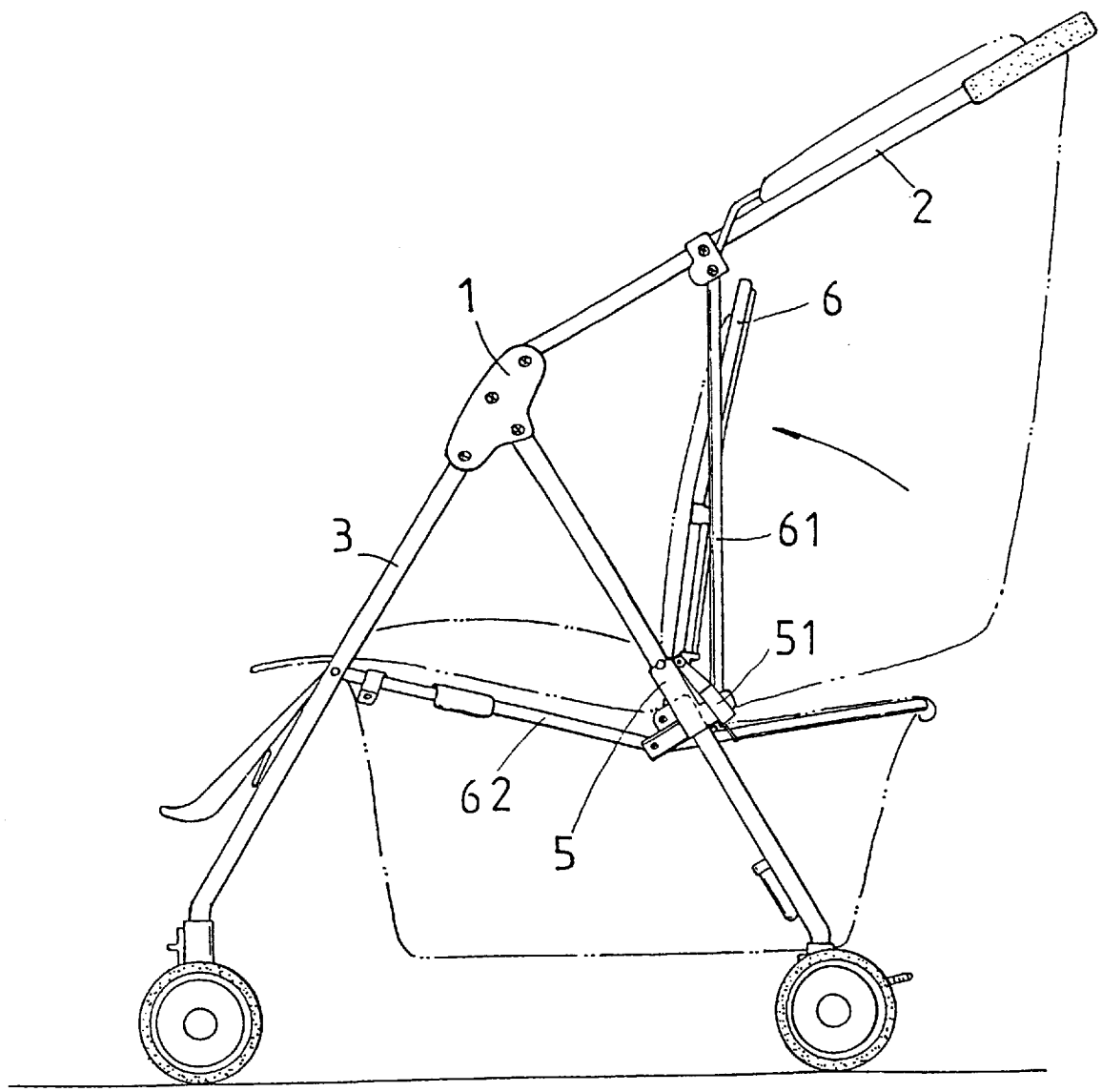
FIG. 4 is a view showing a first step of collapsing an expanded stroller of the present invention.

Referring to FIGS. 1, 2, and 3, a collapsible stroller of the present invention includes a connecting member 1, a push handle 2, a front supporting member 3, a rear supporting member 4, a connecting block 5, a seat frame 6, and wheels 31, 43 as the main parts; the push handle 2, the front supporting member 3 and the rear supporting member 4 are pivoted to the connecting member 1; the connecting block 5 is connected to, and can move relative to, the rear supporting member 4; the wheels 31 are fitted to lower end portion of the front supporting member 3 to provide mobility for the stroller; the wheels 43 are fitted to lower end portion of the rear supporting member 4 to provide mobility for the stroller.

A connecting rod 62 is pivoted to the front supporting rod 3 at one end, and pivoted to the connecting block 5 at the other end. A connecting rod 61 is pivoted to the push handle 2 at one end, and pivoted to the connecting block 5 at the other end.

The seat frame 6 is pivotally connected to connecting block 5 at one end thereof; the seat frame 6 is provided for a seat (not numbered) to be mounted thereon such that a child can lie on the seat of the stroller.

Furthermore, referring to FIG. 3, a pressing block 51 is pivotally connected to the connecting block 5, and has a depressing projection 511. The rear supporting member 4 has an engaging protrusion 42 which is normally urged by elastic members to stay in a position projecting above the rear supporting member 4, and can be depressed into the rear supporting member 4.

When the collapsible stroller of the present invention is expanded to a use position, the engaging protrusion 42 projects above the rear supporting member 4, and engages lower end of the connecting block 5 to stop the connecting block 5 from moving further downward, thus, the expanded stroller can not be unwarily folded.

Figure 7:
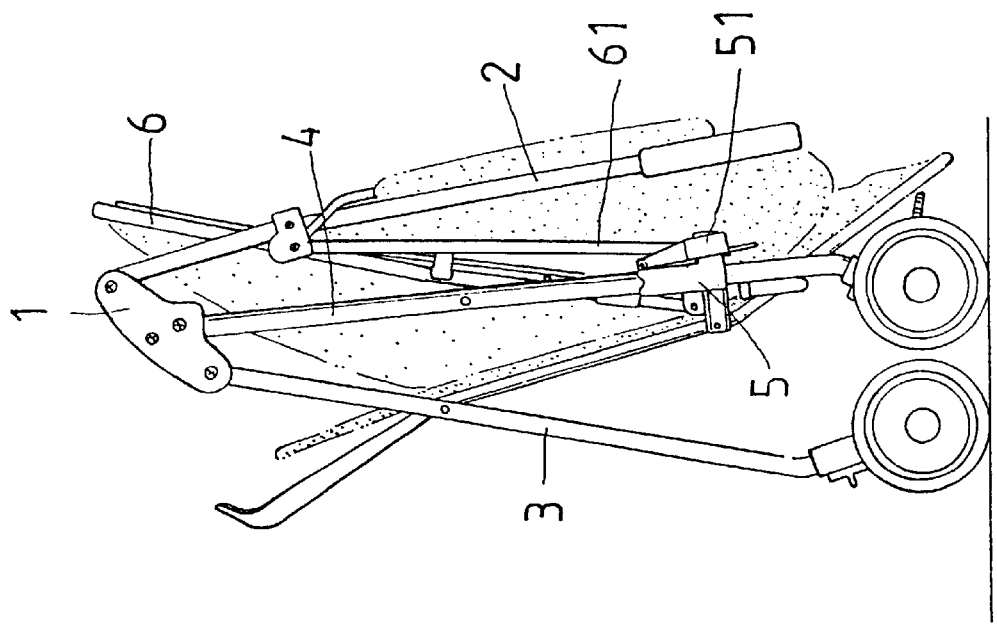
FIG. 7 is a side view of a stroller of the present invention in the folded position; and, FIG. 8 is a view showing the connection between the connecting block and the engaging protrusion.
Figure 6:
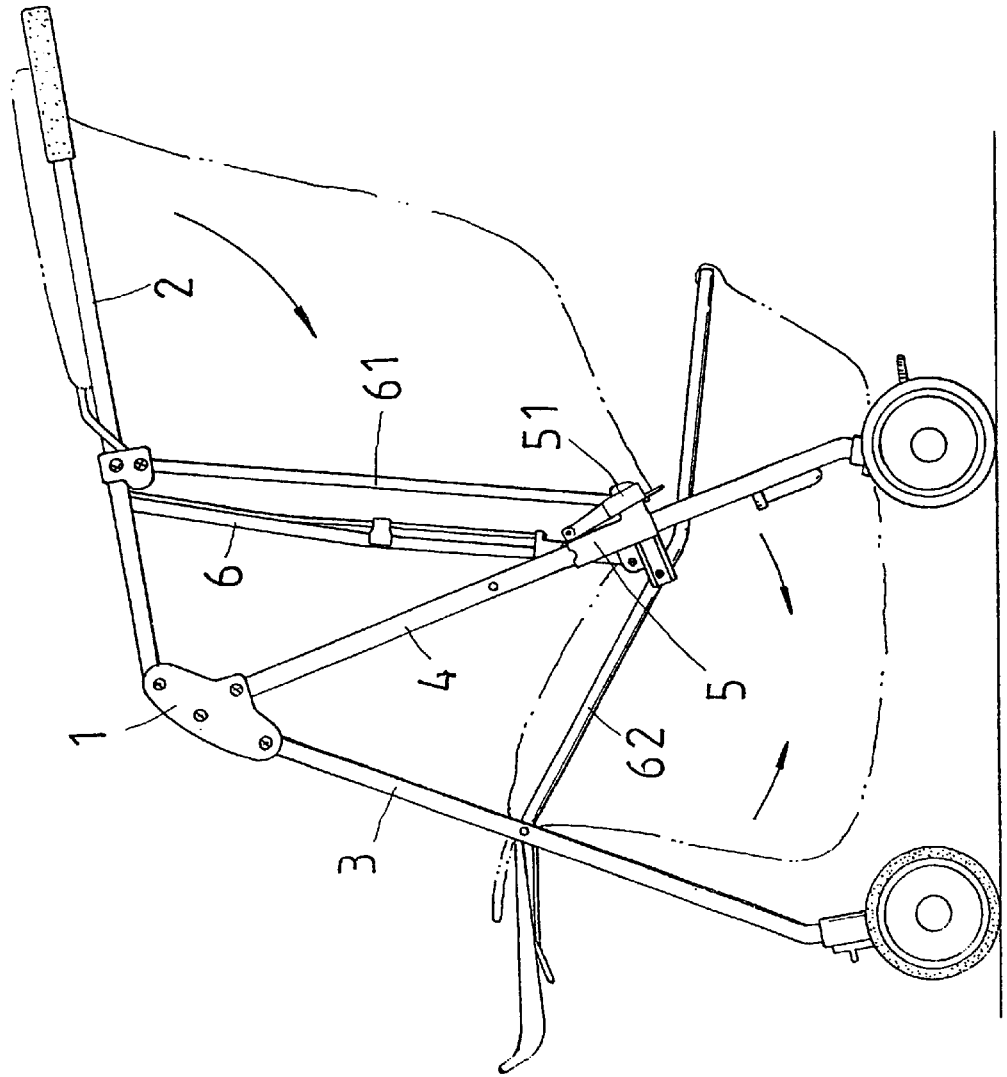
FIG. 6 is a view showing a third step of collapsing an expanded stroller of the present invention.

When the user wants to fold the expanded stroller to a storage position, he/she pushes the seat frame 6 upwards as shown in FIG. 6, and then presses the pressing block 51 toward the rear supporting member 4 such that the depressing projection 511 urges the engaging protrusion 42 to move into the rear supporting member 4, the depressing projection 511 being disposed adjacent to the engaging protrusion 42 when the stroller is expanded. Then the user pushes the push handle 2 downward for the connecting block 5 to move downwards until the slope guiding groove 52 of the connecting block 5 passes the engaging protrusion 42, the engaging protrusion 42 being depressed, and not capable of stopping the connecting block 5 from moving downwards. The engaging protrusion 42 will move to the position projecting beyond the rear supporting member 3 after the slope guiding groove 52 of the connecting block 5 moves therethrough. Thus, the collapsible stroller is folded into the storage position as shown in FIG. 7.

When the user wants to expand the folded stroller to a use position, he/she pulls the push handle 6 upwards to move the connecting block 5 upwards by the connection between the connecting block 5 and the connecting rod 61, the slope guiding groove 52 being capable of guiding the connecting block 5 to go past the engaging protrusion 42. The engaging protrusion 42 will move to the position projecting beyond the rear supporting member 4 after the lower end of the connecting block 5 moves past the engaging protrusion 42; thus, the stroller is expanded to the use position.

Figure 8:
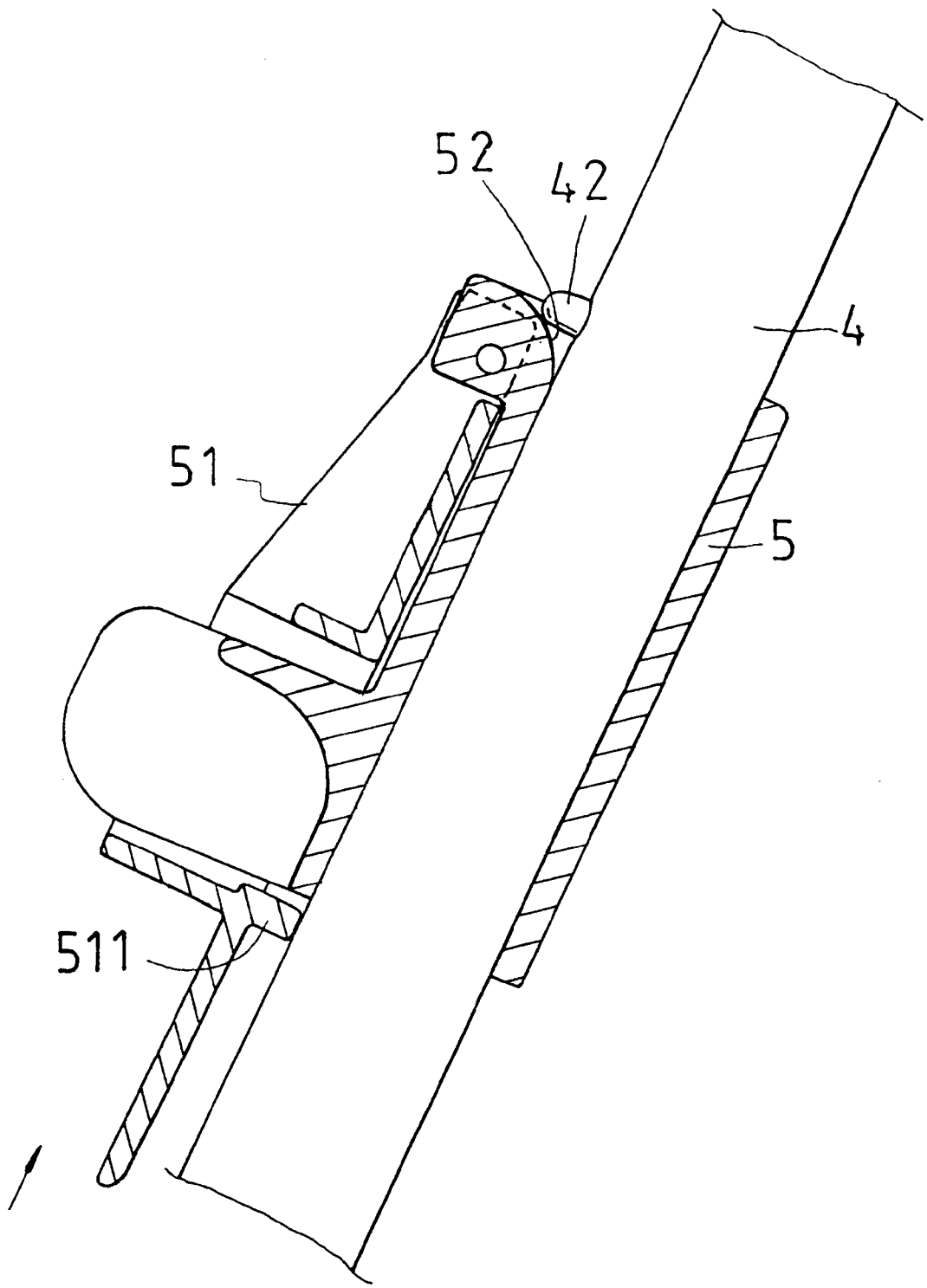

From the above, it can be understood that the collapsible stroller of the present invention has an advantage that it can be folded and expanded with very simply action. Furthermore, the folded stroller can stand on the ground upright and firm with the wheels 31 and 43 all contacting the ground, as shown in FIG. 8.

What is claimed is:

1. A collapsible stroller, comprising:

a push handle pivotally connected to a connecting member of said stroller;

a front supporting member pivotally connected to said connecting member, said front supporting member being provided with wheels at lower ends thereof;

a first connecting rod having a first end pivotally connected to said front supporting member;

a rear supporting member pivoted to said connecting member, said rear supporting member being provided with wheels at lower ends thereof, said rear supporting member having an engaging protrusion urged by an elastic member to project beyond an outer surface of the rear supporting member, said engaging protrusion being capable of being depressed into said rear supporting member;

a connecting block slidably connected to said rear supporting member, said connecting block having a pressing block pivotally connected thereto, and a slope guiding groove at an upper end portion of the connecting block, said pressing block having a depressing projection; a second end of said first connecting rod being pivotally connected to said connecting block;

a second connecting rod having a first end pivotally connected to said push handle and a second end pivotally connected to said connecting block;

said engaging protrusion being capable of engaging a lower end of said connecting block to stop said connecting block from moving downwardly along said rear supporting member when said stroller is expanded to a use position;

said depressing projection of said pressing block being disposed adjacent to said engaging protrusion when said stroller is expanded to said use position;

said depressing projection being capable of urging said engaging protrusion into said rear supporting member for permitting connecting block to be capable of moving downwardly along with said push handle to fold said stroller to a folded storage position;

said slope guiding groove of said connecting block being capable of moving past said engaging protrusion for permitting connecting block to move upwardly to expand said stroller from said folded storage position to said use position upon pulling said push handle upwardly.

* * * * *